(12) United States Patent
Patel

(10) Patent No.: US 10,010,191 B1
(45) Date of Patent: Jul. 3, 2018

(54) MATTRESS BAG ASSEMBLY

(71) Applicant: Rohit Patel, Vidalia, GA (US)

(72) Inventor: Rohit Patel, Vidalia, GA (US)

( * ) Notice: Subject to any disclaimer, the term of this patent is extended or adjusted under 35 U.S.C. 154(b) by 0 days.

(21) Appl. No.: 15/654,173

(22) Filed: Jul. 19, 2017

(51) Int. Cl.
| | | |
|---|---|---|
| *A47C 31/10* | (2006.01) | |
| *A47C 31/00* | (2006.01) | |
| *A47G 9/04* | (2006.01) | |
| *A47G 9/00* | (2006.01) | |
| *A01M 1/14* | (2006.01) | |
| *A01M 29/34* | (2011.01) | |

(52) U.S. Cl.
CPC ............. *A47C 31/105* (2013.01); *A01M 1/14* (2013.01); *A47C 31/007* (2013.01); *A47G 9/04* (2013.01); *A01M 29/34* (2013.01); *A47G 2009/001* (2013.01)

(58) Field of Classification Search
CPC ...... A47G 9/02; A47G 9/0238; A47G 9/0246; A47G 2009/001; A47G 9/04; A47C 31/007; A47C 31/105; A01M 1/14; A01M 1/145; A01M 1/10; A01M 1/103; A01M 1/02; A01M 1/023; A01M 1/026; A01M 29/30; A01M 29/34
USPC ...... 5/499, 497, 496, 482, 738; 43/109, 114, 43/123
See application file for complete search history.

(56) References Cited

U.S. PATENT DOCUMENTS

| | | | | |
|---|---|---|---|---|
| 1,882,538 | A * | 10/1932 | Wunderlich | A47C 27/0453 5/193 |
| 4,706,313 | A * | 11/1987 | Murphy | A47C 27/148 5/722 |
| 6,381,778 | B1 * | 5/2002 | Peterson | A47C 27/005 5/484 |
| 8,347,430 | B2 | 1/2013 | Malouf et al. | |
| 8,413,276 | B2 | 4/2013 | Rattner et al. | |
| 8,429,777 | B2 | 4/2013 | Svoboda | |
| 8,516,633 | B2 | 8/2013 | Dobin | |
| 8,528,134 | B2 | 9/2013 | Bell et al. | |
| 8,719,977 | B2 * | 5/2014 | Rabbany | A47C 31/105 5/496 |
| 8,806,678 | B2 * | 8/2014 | Michael | A47C 31/007 5/482 |
| 8,904,581 | B2 * | 12/2014 | Rabbany | A47C 31/105 5/485 |
| 9,179,783 | B2 | 11/2015 | Snell et al. | |
| 9,220,254 | B2 * | 12/2015 | Dong | A01M 1/14 |
| 2008/0305134 | A1 * | 12/2008 | Lucas | A01N 25/34 424/403 |
| 2010/0043274 | A1 | 2/2010 | Battick | |

(Continued)

*Primary Examiner* — Robert G Santos

(57) ABSTRACT

A mattress bag assembly includes a bag that is selectively be positioned around a mattress. A first barrier unit is coupled to the mattress to pose an obstacle for the bed bugs thereby requiring the bed bugs to crawl over the first barrier unit. The first barrier unit includes a first adhesive to adhere to the bed bugs when the bed bugs crawl over the first barrier unit. Thus, the bed bugs are inhibited from accessing a person lying on the mattress. A second barrier unit is coupled to the mattress to pose an obstacle for the bed bugs thereby requiring the bed bugs to crawl over the second barrier unit. The second barrier unit includes a second adhesive to adhere to the bed bugs when the bed bugs crawl over the second barrier unit. Thus, the bed bugs are inhibited from accessing a person lying on the mattress.

8 Claims, 6 Drawing Sheets

(56) References Cited

U.S. PATENT DOCUMENTS

| | | | |
|---|---|---|---|
| 2010/0043275 A1 | 2/2010 | Battick | |
| 2011/0311603 A1* | 12/2011 | Lucas | A01N 25/34 |
| | | | 424/411 |
| 2012/0084918 A1* | 4/2012 | Rattner | A47C 31/105 |
| | | | 5/500 |
| 2012/0167301 A1* | 7/2012 | Michael | A47C 31/007 |
| | | | 5/482 |
| 2012/0167309 A1* | 7/2012 | Heidorn | A01M 1/103 |
| | | | 5/691 |
| 2012/0291337 A1 | 11/2012 | Curcio | |
| 2013/0067796 A1* | 3/2013 | Dong | A01M 1/14 |
| | | | 43/109 |
| 2013/0139316 A1* | 6/2013 | Rabbany | A47C 31/105 |
| | | | 5/499 |
| 2014/0137325 A1* | 5/2014 | Rabbany | A47C 31/105 |
| | | | 5/499 |
| 2016/0262366 A1 | 9/2016 | Rola | |

* cited by examiner

MATTRESS BAG ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to bag devices and more particularly pertains to a new bag device for inhibiting bed bugs from gaining access to a host.

BRIEF SUMMARY OF THE INVENTION

An embodiment of the disclosure meets the needs presented above by generally comprising a bag that is selectively be positioned around a mattress. A first barrier unit is coupled to the mattress to pose an obstacle for the bed bugs thereby requiring the bed bugs to crawl over the first barrier unit. The first barrier unit includes a first adhesive to adhere to the bed bugs when the bed bugs crawl over the first barrier unit. Thus, the bed bugs are inhibited from accessing a person lying on the mattress. A second barrier unit is coupled to the mattress to pose an obstacle for the bed bugs thereby requiring the bed bugs to crawl over the second barrier unit. The second barrier unit includes a second adhesive to adhere to the bed bugs when the bed bugs crawl over the second barrier unit. Thus, the bed bugs are inhibited from accessing a person lying on the mattress.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
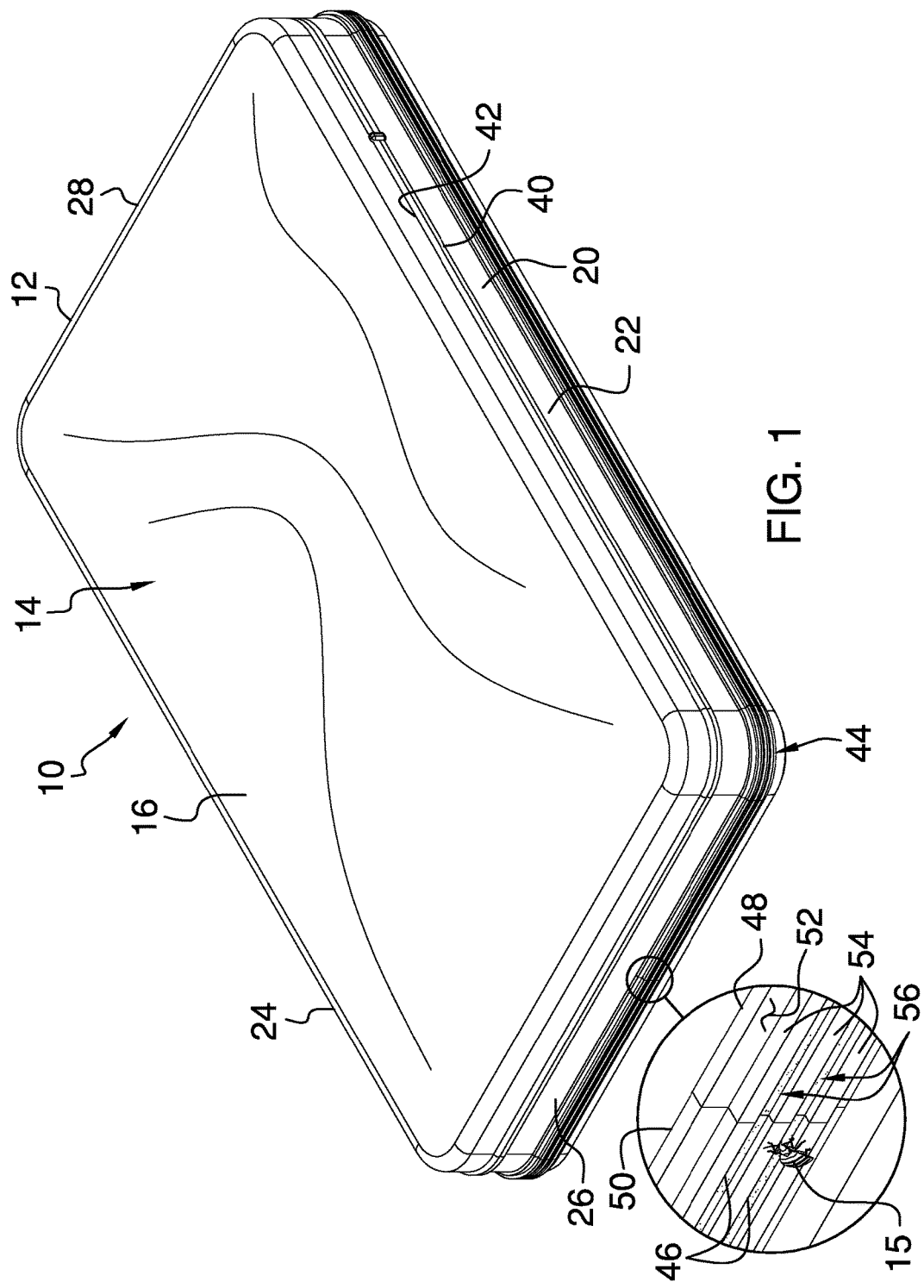
FIG. 1 is a top perspective view of a mattress bag assembly according to an embodiment of the disclosure.
Figure 2:
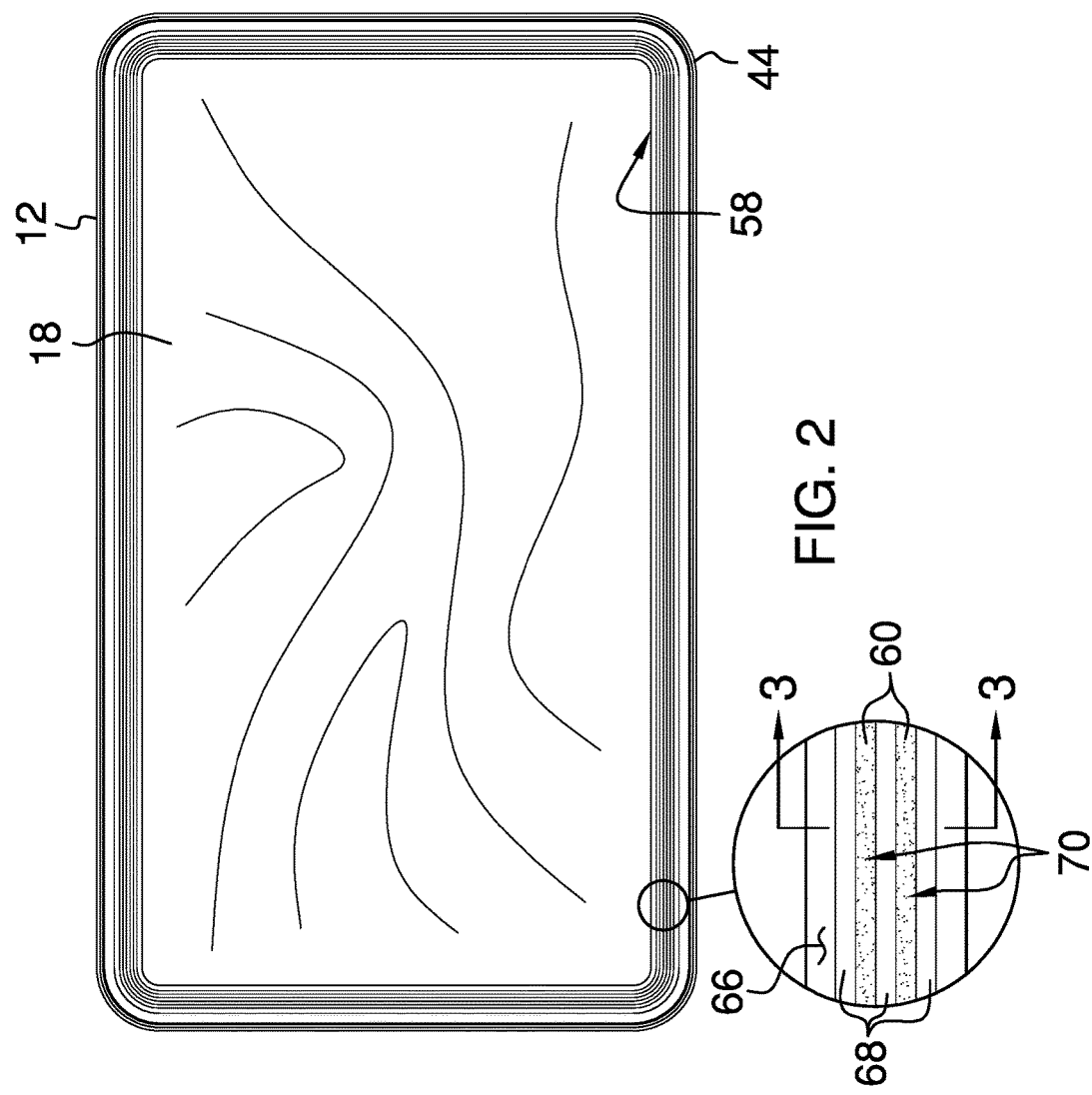
FIG. 2 is a bottom view of an embodiment of the disclosure.
Figure 3:
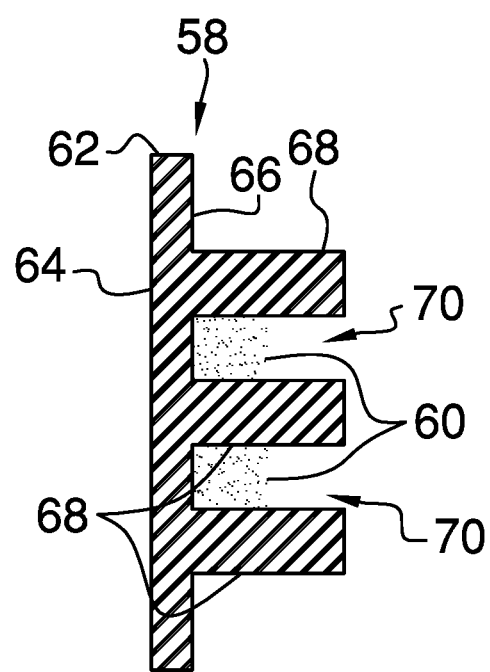
FIG. 3 is a cross sectional view taken along line 3-3 of FIG. 2 of an embodiment of the disclosure.
Figure 4:
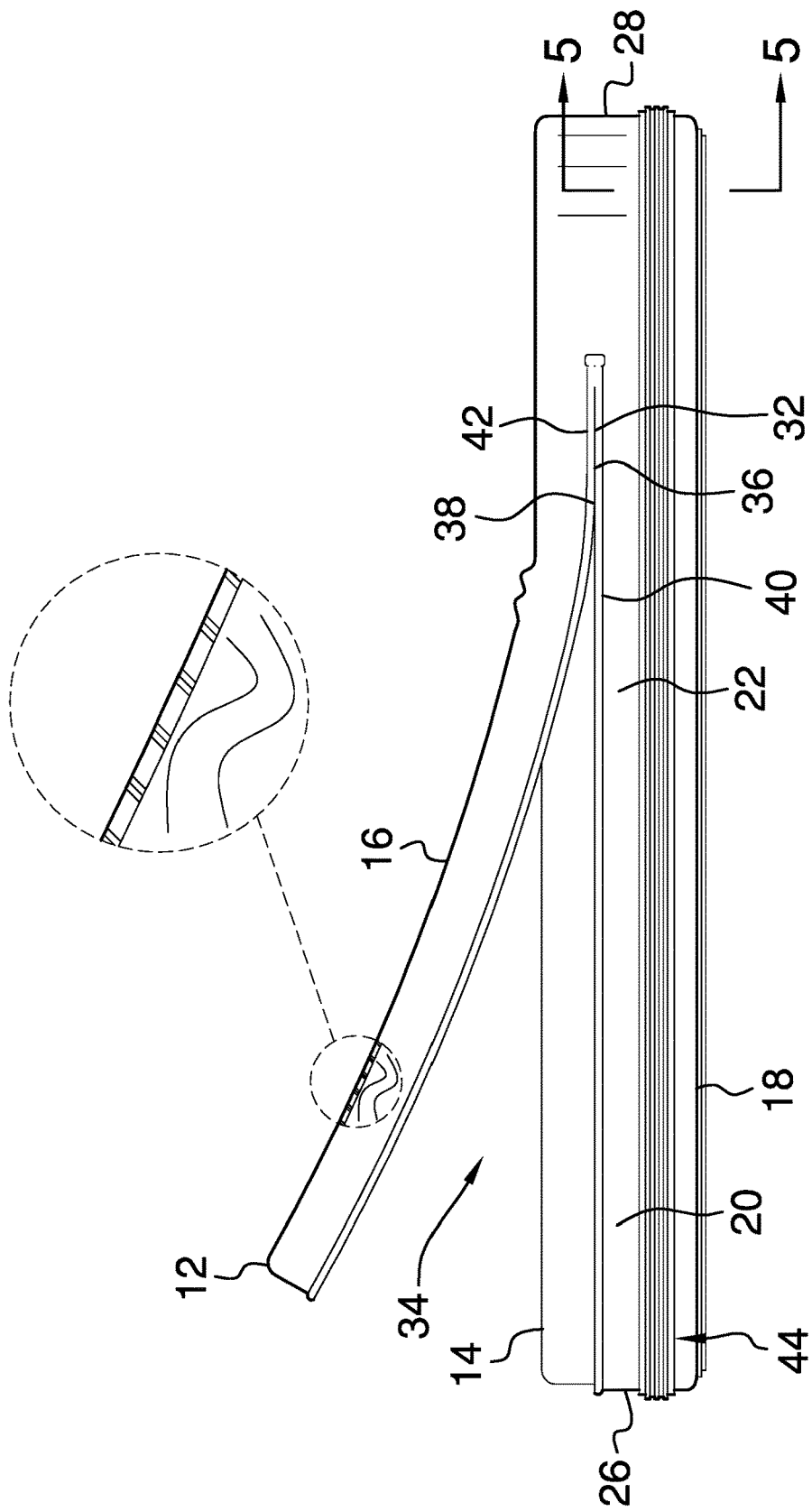
FIG. 4 is a right side view of an embodiment of the disclosure.

With reference now to the drawings, and in particular to FIGS. 1 through 8 thereof, a new bag device embodying the principles and concepts of an embodiment of the disclosure and generally designated by the reference numeral 10 will be described.

As best illustrated in FIGS. 1 through 8, the mattress bag assembly 10 generally comprises a bag 12 that is positioned around a mattress 14 thereby inhibiting bed bugs 15 from escaping the bag 12. The mattress 14 may include a box spring, and the box spring may be positioned in the bag 12 along with the mattress 14. Additionally, the box spring may be positioned in the bag 12 and the mattress 14 may not be positioned in the bag 12. The bag 12 may be manufactured in a variety of sizes to accommodate varying sizes of mattresses and box springs.

The bag 12 has a top wall 16, a bottom wall 18 and a perimeter wall 20 extending therebetween. The perimeter wall 20 has a first lateral side 22, a second lateral side 24, a front side 26 and a back side 28. The bag 12 has an outside surface 30 and the perimeter wall 20 has a cut 32 therein. The cut 32 extends along the front side 26 and substantially along each of the first 22 and second 24 lateral sides to define an opening 34 into the bag 12. The opening 34 receives the mattress 14 and/or the box spring having the mattress 14 and/or the box spring lying on the bottom wall 18. The cut 32 has a first bounding edge 36 and a second bounding edge 38. Additionally, the bag 12 may be comprised of a fluid permeable material.

A first fastener 40 is coupled to the bag 12 and the first fastener 40 is coextensive with the first bounding edge 36. A second fastener 42 is coupled to the bag 12 and the second fastener 42 is coextensive with the second bounding edge 38. The first fastener 40 is selectively matable to the second fastener 42 to close the opening. Each of the first 40 and second 42 fasteners may comprise a zipper or the like.

A first barrier unit 44 is coupled to the mattress 14 and the first barrier unit 44 poses an obstacle for the bed bugs 15 thereby requiring the bed bugs 15 to crawl over the first barrier unit 44. The first barrier unit 44 includes a first adhesive 46 to adhere to the bed bugs 15 when the bed bugs 15 crawl over the first barrier unit 44. In this way the bed bugs 15 are inhibited from accessing a person lying on the mattress 14.

The first barrier unit 44 comprises a first panel 48 that has a first surface 50 and a second surface 52. The first surface 50 is coupled to the outside surface 30 corresponding to the perimeter wall 20 of the bag 12. Moreover, the first panel 48 is continuous such that the first panel 48 extends around the first lateral side 22, the second lateral side 24, the front side 26 and the back side 28 of the bag 12. The first panel 48 is positioned between the cut 32 and the bottom wall 18.

A plurality of first walls 54 extends away from the second surface 52 of the first panel 48 and each of the first walls 54 is oriented perpendicular to the first panel 48. The first walls 54 are spaced apart from each other to define a plurality of first grooves 56 between each of the first walls 54. Each of the first walls 54 requires the bed bugs 15 crawl over the first walls 54 and into the first grooves 56 when the bed bugs 15 crawl upwardly along the perimeter wall 20 of the bag 12. The first adhesive 46 is positioned on the second surface 52 corresponding to each of the first grooves 56. Thus, the first adhesive 46 adheres to the bed bugs 15 when the bed bugs 15 crawl into the first grooves 56.

A second barrier unit 58 is coupled to the mattress 14 to pose an obstacle for the bed bugs 15 thereby requiring the bed bugs 15 to crawl over the second barrier unit 58. The second barrier unit 58 includes a second adhesive 60 to adhere to the bed bugs 15 when the bed bugs 15 crawl over the second barrier unit 58. In this way the second adhesive 60 inhibits the bed bugs 15 from accessing the person lying on the mattress 14.

The second barrier unit 58 comprises a second panel 62 that has a first surface 64 and a second surface 66. The first surface 64 of the second panel 62 is coupled to the outside surface 30 corresponding to the bottom wall 18 of the bag 12. Moreover, the second panel 62 is continuous such that the second panel 62 is aligned with the first lateral side 22, the second lateral side 24, the front side 26 and the back side 28 of the bag 12.

A plurality of second walls 68 extends away from the second surface 66 of the second panel 62 and each of the second walls 68 is oriented perpendicular to the second panel 62. The second walls 68 are spaced apart from each other to define a plurality of second grooves 70 between each of the second walls 68. Each of the second walls 68 requires the bed bugs 15 to crawl over the second walls 68 and into the second grooves 70 when the bed bugs 15 attempt to crawl from the bottom wall 18 to the perimeter wall 20 of the bag 12. The second adhesive 60 is positioned on the second surface 66 corresponding to each of the second grooves 70. In this way the second adhesive 60 adheres to the bed bugs 15 when the bed bugs 15 crawl into the second grooves 70.

Figure 7:
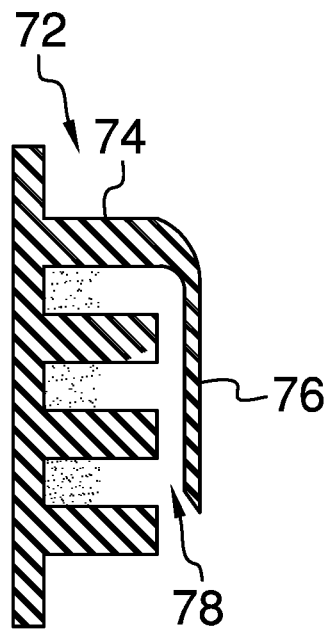
FIG. 7 is a right side view of an alternative embodiment of the disclosure.
Figure 8:
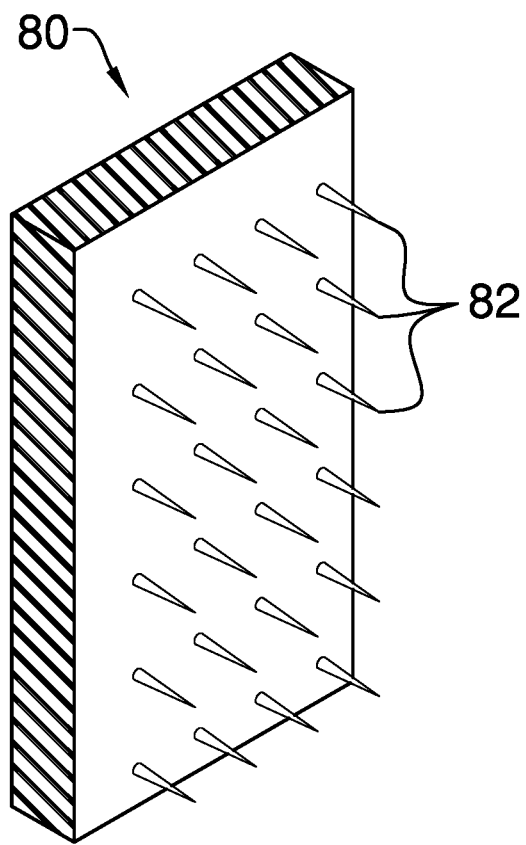
FIG. 8 is a front perspective view of an alternative embodiment of the disclosure.

In an alternative embodiment 72 as shown in FIG. 7, each of the first 44 and second 58 barrier units may include a leg 74 and a foot 76. The leg 74 may extend away from the second surface 52 of the corresponding first 44 and second 58 barrier units. Additionally, the foot 76 may be spaced from each of corresponding first 54 and second 68 walls to define a channel 78 that intersects the corresponding first 56 and second 70 grooves. Thus, the bed bugs 15 are forced into the corresponding first 56 and second 70 grooves when the bed bugs 15 crawl over the first 44 and second 58 barrier units. In an alternative embodiment 80 as shown in FIG. 8, each of the first 44 and second 58 barrier units may include a plurality of spikes 82. The spikes 82 corresponding to each of the first 44 and second 58 barrier units may extend away from the second surface 52 of the corresponding first 48 and second 62 panels.

Figure 5:
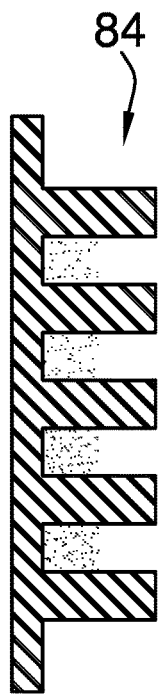
FIG. 5 is a perspective view of an alternative embodiment of the disclosure.
Figure 6:
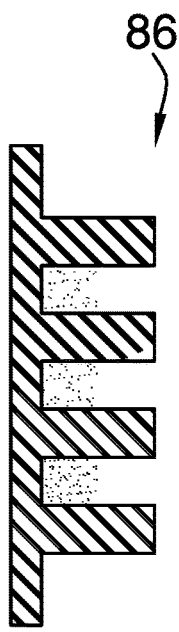
FIG. 6 is a perspective view of an alternative embodiment of the disclosure.

The first barrier unit 44 may include three first walls 54 and the second barrier unit 58 may include three second walls 68. In an alternative embodiment 84 as shown in FIG. 5, each of the first 44 and second 58 barrier units may include five corresponding first walls 54 and five corresponding second walls 68. In an alternative embodiment 86 as shown in FIG. 6, each of the first 44 and second 58 barrier units may include four corresponding first walls 54 and four corresponding second walls 68.

In use, the mattress 14 and/or box spring is inserted into the opening in the bag 12 and the first 40 and second 42 fasteners are manipulated to close the bag 12. The bed bugs 15, and other insects, are forced to crawl over the first barrier unit 44 when the bed beg, and other insects, crawl upwardly on the perimeter wall 20 of the bag 12. Additionally, the first adhesive 46 adheres to the bed bugs 15, and other insects, when bed bugs 15, and other insects, crawl across the first barrier unit 44. In this way the bed bugs 15, and other insects, are inhibited from accessing the person on the mattress 14. Thus, the bed bugs 15 are inhibited from feeding and therefore starve to death. The bed bugs 15, and other insects, are forced to crawl over the second barrier unit 58 when the bed bugs 15, and other insects, attempt to crawl from the bottom wall 18 of the bag 12 to the perimeter wall 20 of the bag 12. The second adhesive 60 adheres to the bed bugs 15, and other insects, when bed bugs 15, and other insects, crawl across the second barrier unit 58. In this way the bed bugs 15 are inhibited from feeding and therefore starve to death.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A mattress bag assembly being configured to inhibit bed bugs from accessing a person on a mattress, said assembly comprising:

a bag being configured to be positioned around a mattress thereby inhibiting bed bugs from escaping said bag, said bag having a top wall, a bottom wall and a perimeter wall extending therebetween, said perimeter wall having a first lateral side, a second lateral side, a front side and a back side, said bag having an outside surface;

a first fastener being coupled to said bag;

a second fastener being coupled to said bag, said first fastener being selectively matable to said second fastener to close said bag;

a first barrier unit being coupled to said mattress wherein said first barrier unit is configured to pose an obstacle for the bed bugs thereby requiring the bed bugs to crawl over said first barrier unit, said first barrier unit including a first adhesive wherein said first adhesive is configured to adhere to the bed bugs when the bed bugs crawl over said first barrier unit thereby inhibiting the bed bugs from accessing a person lying on the mattress, said first barrier unit comprising a first panel having a first surface and a second surface, said first surface being coupled to said outside surface corresponding to said perimeter wall of said bag, said first barrier unit comprising a plurality of first walls, each of said first walls extending away from said second surface of said first panel, each of said first walls being oriented perpendicular to said first panel, said first walls being spaced apart from each other to define a plurality of first grooves between each of said first walls wherein each of said first walls is configured to have the bed bugs crawl over said first walls and into said first grooves, said first barrier including a leg and a foot, said leg extending away from said first second surface of said first panel, said foot being coupled to and extending perpendicularly from said leg wherein said foot extends in spaced relationship to distal edges of said first wall relative to said first panel and over said first grooves; and a second barrier unit being coupled to said mattress wherein said second barrier unit is configured to pose an obstacle for the bed bugs thereby requiring the bed bugs to crawl over said second barrier unit, said second barrier unit including a second adhesive wherein said second adhesive is configured to adhere to the bed bugs when the bed bugs crawl over said second barrier unit thereby inhibiting the bed bugs from accessing a person lying on the mattress.

2. The assembly according to claim 1, wherein said perimeter wall has a cut therein, said cut extending along said front side and substantially along each of said first and second lateral sides to define an opening into said bag wherein said opening is configured to receive the mattress having said mattress lying on said bottom wall, said cut having a first bounding edge and a second bounding edge.

3. The assembly according to claim 2, said first panel is continuous such that said first panel extends around said first lateral side, said second lateral side, said front side and said back side of said bag, said first panel being positioned between said cut and said bottom wall.

4. The assembly according to claim 1, wherein said first adhesive is positioned on said second surface corresponding to each of said first grooves wherein said first adhesive is configured to adhere to the bed bugs when the bed bugs crawl into said first grooves.

5. The assembly according to claim 1, wherein said second barrier unit comprises a second panel having a first surface and a second surface, said first surface of said second panel being coupled to said outside surface corresponding to said bottom wall of said bag, said second panel being continuous such that said second panel is aligned with said first lateral side, said second lateral side, said front side and said back side of said bag.

6. The assembly according to claim 5, further comprising a plurality of second walls, each of said second walls extending away from said second surface of said second panel, each of said second walls being oriented perpendicular to said second panel, said second walls being spaced apart from each other to define a plurality of second grooves between each of said second walls wherein each of said second walls is configured to have the bed bugs crawl over said second walls and into said second grooves.

7. The assembly according to claim 6, wherein said second adhesive is positioned on said second surface corresponding to each of said second grooves wherein said second adhesive is configured to adhere to the bed bugs when the bed bugs crawl into said second grooves.

8. A mattress bag assembly being configured to inhibit bed bugs from accessing a person on a mattress, said assembly comprising:

a bag being configured to be positioned around a mattress thereby inhibiting bed bugs from escaping said bag, said bag having a top wall, a bottom wall and a perimeter wall extending therebetween, said perimeter wall having a first lateral side, a second lateral side, a front side and a back side, said bag having an outside surface, said perimeter wall having a cut therein, said cut extending along said front side and substantially along each of said first and second lateral sides to define an opening into said bag wherein said opening is configured to receive the mattress having said mattress lying on said bottom wall, said cut having a first bounding edge and a second bounding edge;

a first fastener being coupled to said bag, said first fastener being coextensive with said first bounding edge;

a second fastener being coupled to said bag, said second fastener being coextensive with said second bounding edge, said first fastener being selectively matable to said second fastener to close said opening;

a first barrier unit being coupled to said mattress wherein said first barrier unit is configured to pose an obstacle for the bed bugs thereby requiring the bed bugs to crawl over said first barrier unit, said first barrier unit including an first adhesive wherein said first adhesive is configured to adhere to the bed bugs when the bed bugs crawl over said first barrier unit thereby inhibiting the bed bugs from accessing a person lying on the mattress, said first barrier unit comprising:

a first panel having a first surface and a second surface, said first surface being coupled to said outside surface corresponding to said perimeter wall of said bag, said first panel being continuous such that said first panel extends around said first lateral side, said second lateral side, said front side and said back side of said bag, said first panel being positioned between said cut and said bottom wall, a plurality of first walls, each of said first walls extending away from said second surface of said first panel, each of said first walls being oriented perpendicular to said first panel, said first walls being spaced apart from each other to define a plurality of first grooves between each of said first walls wherein each of said first walls is configured to have the bed bugs crawl over said first walls and into said first grooves, said first adhesive being positioned on said second surface corresponding to each of said first grooves wherein said first adhesive is configured to adhere to the bed bugs when the bed bugs crawl into said first grooves, and a leg and a foot, said leg extending away from said first second surface of said first panel, said foot being coupled to and extending perpendicularly from said leg wherein said foot extends in spaced relationship to distal edges of said first wall relative to said first panel and over said first grooves; and a second barrier unit being coupled to said mattress wherein said second barrier unit is configured to pose an obstacle for the bed bugs thereby requiring the bed bugs to crawl over said second barrier unit, said second barrier unit including a second adhesive wherein said second adhesive is configured to adhere to the bed bugs when the bed bugs crawl over said second barrier unit thereby inhibiting the bed bugs from accessing a person lying on the mattress, said second barrier unit comprising:

a second panel having a first surface and a second surface, said first surface of said second panel being coupled to said outside surface corresponding to said bottom wall of said bag, said second panel being continuous such that said second panel is aligned with said first lateral side, said second lateral side, said front side and said back side of said bag, and a plurality of second walls, each of said second walls extending away from said second surface of said second panel, each of said second walls being oriented perpendicular to said second panel, said second walls being spaced apart from each other to define a plurality of second grooves between each of said second walls wherein each of said second walls is configured to have the bed bugs crawl over said second walls and into said second grooves, said second adhesive being positioned on said second surface corresponding to each of said second grooves wherein said second adhesive is configured to adhere to the bed bugs when the bed bugs crawl into said second grooves.

* * * * *